(12) United States Patent
Russell et al.

(10) Patent No.: US 10,855,551 B2
(45) Date of Patent: Dec. 1, 2020

(54) MULTI-PORT SELECTION AND CONFIGURATION

(71) Applicant: Dell Products L.P., Round Rock, TX (US)

(72) Inventors: Deborah C. Russell, Austin, TX (US); Andrew Berry, Austin, TX (US); Craig Phelps, Austin, TX (US); Brooks Piggott, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 261 days.

(21) Appl. No.: 14/588,029

(22) Filed: Dec. 31, 2014

(65) Prior Publication Data
US 2016/0191314 A1    Jun. 30, 2016

(51) Int. Cl.
*H04L 12/24* (2006.01)
*H04L 12/28* (2006.01)

(52) U.S. Cl.
CPC .......... *H04L 41/22* (2013.01); *H04L 41/0806* (2013.01); *H04L 41/24* (2013.01); *H04L 41/0889* (2013.01)

(58) Field of Classification Search
CPC . H04L 41/0806; H04L 41/0889; H04L 41/22; H04L 41/24; H04L 12/24
USPC .................................................. 709/221–245
See application file for complete search history.

(56) References Cited

U.S. PATENT DOCUMENTS

| | | | | |
|---|---|---|---|---|
| 6,169,729 B1* | 1/2001 | Feuerstraeter | ........ | H04L 49/351 370/296 |
| 6,226,299 B1* | 5/2001 | Henson | ..................... | H04L 1/00 370/420 |
| 6,229,538 B1* | 5/2001 | McIntyre | .............. | G06F 11/324 709/220 |
| 6,330,005 B1* | 12/2001 | Tonelli | .................. | H04L 41/145 715/734 |
| 6,393,483 B1* | 5/2002 | Latif | .................. | H04L 41/0668 370/230 |

(Continued)

OTHER PUBLICATIONS

Edward Tetz, "Configuring A Range Of Switch Interfaces", Configuring A Range Of Interfaces—For Dummies, Cisco Networking All-In-One For Dummies, pp. 1-2, http://www.dummies.com/how-to/content/configuring-a-range-of-switch-interfaces.html.

(Continued)

*Primary Examiner* — David R Lazaro
*Assistant Examiner* — Berhanu Shitayewoldetadik
(74) *Attorney, Agent, or Firm* — Haynes and Boone, LLP

(57) ABSTRACT

A multi-port configuration system includes a network switch including a plurality of ports and a user device that is configured to couple to the network switch. Each of the plurality of ports is configured to operate in at least one of a plurality of modes. A congruent graphical representation of the network switch is displayed on the user device, and a selection of a group of ports of the plurality of ports is received. Based on the received selection of the group of ports, available configuration settings for the group of ports are displayed on the user device. A configuration settings selection, selected from the available configuration settings, for configuring the group of ports is received. The configuration settings selection is provided to the network switch to configure the group of ports.

20 Claims, 15 Drawing Sheets

(56) References Cited

U.S. PATENT DOCUMENTS

| | | | | |
|---|---|---|---|---|
| 6,650,347 B1* | 11/2003 | Nulu | H04L 67/36 | 700/83 |
| 6,772,204 B1* | 8/2004 | Hansen | H04L 41/0883 | 709/220 |
| 6,772,270 B1* | 8/2004 | Kurpanek | H04L 29/06 | 385/100 |
| 6,845,395 B1* | 1/2005 | Blumenau | H04L 29/06 | 709/223 |
| 6,871,221 B1* | 3/2005 | Styles | H04L 41/0843 | 709/220 |
| 6,955,477 B1* | 10/2005 | Coffey | H04L 43/00 | 385/53 |
| 7,173,912 B2* | 2/2007 | Jaber | H04L 41/12 | 370/254 |
| 7,310,774 B1* | 12/2007 | Arquie | H04L 41/12 | 715/734 |
| 7,315,985 B1* | 1/2008 | Gauvin | H04L 41/12 | 715/734 |
| 7,411,915 B1* | 8/2008 | Spain | H04L 41/0806 | 370/250 |
| 7,523,187 B1* | 4/2009 | Lavallee | H04L 41/12 | 709/220 |
| 7,752,295 B2* | 7/2010 | Terai | H04L 12/4641 | 709/223 |
| 7,895,300 B1* | 2/2011 | Tansey | G06F 13/4022 | 709/220 |
| 7,898,986 B2* | 3/2011 | Ford | H04L 41/0806 | 370/255 |
| 8,000,600 B2* | 8/2011 | Girardi | H04L 43/0811 | 398/33 |
| 8,146,027 B1* | 3/2012 | Lindop | G06F 30/30 | 716/102 |
| 8,255,466 B2* | 8/2012 | Flack | H04L 43/00 | 709/206 |
| 8,639,783 B1* | 1/2014 | Bakke | H04L 49/70 | 709/220 |
| 8,671,311 B2* | 3/2014 | Gara | G06F 11/1641 | 714/11 |
| 9,049,114 B2* | 6/2015 | Frey | H04L 43/50 | |
| 9,130,835 B1* | 9/2015 | White | H04L 43/10 | |
| 9,148,358 B2* | 9/2015 | Breslin | H04L 43/12 | |
| 9,253,120 B1* | 2/2016 | Dropps | G06F 13/426 | |
| 9,262,285 B1* | 2/2016 | Wang | H04L 67/1097 | |
| 9,288,120 B2* | 3/2016 | Chawla | H04L 41/0803 | |
| 9,407,503 B2* | 8/2016 | Kusumoto | H04L 45/245 | |
| 9,548,888 B1* | 1/2017 | Fair | H04L 41/0893 | |
| 9,769,036 B1* | 9/2017 | Sweeney | H04L 41/26 | |
| 2002/0006112 A1* | 1/2002 | Jaber | H04L 45/00 | 370/238 |
| 2002/0073210 A1* | 6/2002 | Low | G06Q 40/04 | 709/228 |
| 2004/0049564 A1* | 3/2004 | Ng | H04L 69/329 | 709/223 |
| 2004/0095955 A1* | 5/2004 | Subramanian | H04L 41/22 | 370/458 |
| 2005/0050205 A1* | 3/2005 | Gordy | G06F 13/387 | 709/227 |
| 2005/0060394 A1* | 3/2005 | Frechette | H04L 41/0803 | 709/223 |
| 2005/0234683 A1* | 10/2005 | Graves | H04L 41/12 | 703/1 |
| 2006/0146184 A1* | 7/2006 | Gillard | H04L 47/38 | 348/398.1 |
| 2006/0220831 A1* | 10/2006 | Martin | H04L 43/00 | 340/507 |
| 2006/0227779 A1* | 10/2006 | Shimizu | H04L 12/4666 | 370/389 |
| 2006/0265566 A1* | 11/2006 | Sen | G06F 3/0605 | 711/170 |
| 2007/0053368 A1* | 3/2007 | Chang | H04L 41/22 | 370/401 |
| 2007/0179645 A1* | 8/2007 | Nixon | G05B 23/0216 | 700/83 |
| 2008/0001480 A1* | 1/2008 | Ooi | G06F 13/4081 | 307/85 |
| 2008/0060055 A1* | 3/2008 | Lau | H04L 9/3263 | 726/3 |
| 2008/0104213 A1* | 5/2008 | McGee | H04L 43/0811 | 709/223 |
| 2008/0104278 A1* | 5/2008 | Ford | H04L 41/0806 | 709/250 |
| 2009/0219830 A1* | 9/2009 | Venner | H04L 41/0806 | 370/254 |
| 2010/0085599 A1* | 4/2010 | Nomura | G06F 3/1227 | 358/1.15 |
| 2010/0115415 A1* | 5/2010 | Hickey | H04L 41/22 | 715/736 |
| 2011/0110241 A1* | 5/2011 | Atkinson | H04L 41/22 | 370/242 |
| 2011/0110381 A1* | 5/2011 | Atkinson | H04L 47/125 | 370/419 |
| 2011/0142065 A1* | 6/2011 | Reynov | H04L 49/10 | 370/419 |
| 2011/0149800 A1* | 6/2011 | Ryan | H04L 12/467 | 370/254 |
| 2011/0211443 A1* | 9/2011 | Leong | H04L 63/1416 | 370/218 |
| 2011/0243032 A1* | 10/2011 | Jenne | H04L 12/12 | 370/254 |
| 2012/0124398 A1* | 5/2012 | Diab | H04L 43/0817 | 713/310 |
| 2012/0134262 A1* | 5/2012 | Licardie | H04L 45/245 | 370/225 |
| 2012/0185624 A1* | 7/2012 | Dang | G06F 13/40 | 710/104 |
| 2012/0240022 A1* | 9/2012 | Bakshi | G06F 30/327 | 715/209 |
| 2012/0249871 A1* | 10/2012 | Nguyen | G09G 5/006 | 348/441 |
| 2013/0246673 A1* | 9/2013 | Cox | H04L 41/0806 | 710/104 |
| 2013/0272135 A1* | 10/2013 | Leong | H04L 41/0853 | 370/241 |
| 2013/0283025 A1* | 10/2013 | Madonna | H04L 12/2805 | 713/1 |
| 2014/0025902 A1* | 1/2014 | Dhogale | G11C 7/1075 | 711/149 |
| 2014/0064149 A1* | 3/2014 | Frey | H04L 41/0869 | 370/255 |
| 2014/0153441 A1* | 6/2014 | Frey | H04L 49/354 | 370/255 |
| 2014/0181275 A1* | 6/2014 | Lin | H04L 41/0866 | 709/220 |
| 2014/0211808 A1* | 7/2014 | Koren | H04L 41/00 | 370/401 |
| 2014/0248059 A1* | 9/2014 | Tang | H04L 49/352 | 398/136 |
| 2014/0321285 A1* | 10/2014 | Chew | H04L 43/12 | 370/236 |
| 2014/0369347 A1* | 12/2014 | Orsley | H04L 49/25 | 370/358 |
| 2015/0003290 A1* | 1/2015 | Kusumoto | H04L 41/12 | 370/254 |
| 2015/0038135 A1* | 2/2015 | Lu | H04L 5/005 | 455/426.1 |
| 2015/0081104 A1* | 3/2015 | Madonna | H04L 41/22 | 700/275 |
| 2015/0178159 A1* | 6/2015 | Mukai | G06F 11/1048 | 714/764 |
| 2015/0236906 A1* | 8/2015 | Alshinnawi | H04L 41/0806 | 370/345 |
| 2015/0293513 A1* | 10/2015 | Schlette | G05B 19/4183 | 700/86 |
| 2015/0341219 A1* | 11/2015 | Hong | H04L 43/04 | 709/224 |
| 2016/0057008 A1* | 2/2016 | Liu | G06F 3/14 | 709/217 |

(56) References Cited

U.S. PATENT DOCUMENTS

| | | | | |
|---|---|---|---|---|
| 2016/0062736 A1* | 3/2016 | Stanfill | ..................... | G06F 8/34 |
| | | | | 717/105 |
| 2016/0127417 A1* | 5/2016 | Janssen | ............... | H04L 63/1433 |
| | | | | 726/1 |
| 2016/0142260 A1* | 5/2016 | Cafarelli | ................. | H04L 43/12 |
| | | | | 370/250 |

OTHER PUBLICATIONS

"How to Configure Multiple Cisco Switch Ports At The Same Time," How To Configure Multiple Cisco Switch Ports At The Same Time A Tech-Recipes Tutorial, Headhunter in Cisco Switch, pp. 1-3: http://www.tech-recipes.com/rx/714/how-to-configure-multiple-cisco-switch-ports-at-the-same-time/.

"Enabling The Catalyst Web Interface On Catalyst 4500/4000 Series Switches Running CatOS", Jul. 6, 2007, Document ID: 15954, Cisco Systems, Inc.; http://www.cisco.com/c/en/us/support/docs/switches/catalyst-4000-series-switches/15954-105-15954.html.

* cited by examiner

Configure Ports

- Port Selection
- Port Description
- Port Settings
- Summary

Port Settings — 1004

Configure settings for the selected copper ports. — 1006
View Current Port Configurations — 414

Copper Ports

| | | |
|---|---|---|
| Ports | 1, 2 | |
| Port Type | 100M-Copper | ← 1008 |
| Operational Status | Active | ← 1010 |
| Admin Speed | ○ 1000M ○ XXX ○ XXX | ← 1012 |
| Admin Duplex Mode | ○ Full ○ XXX ○ XXX | |
| Auto Negotiation | ○ Enabled ○ Disabled | |
| Admin Advertisement | ☐ Max ☐ 10 Half ☐ 10 Full ☐ 100 Half ☐ 100 Full ☐ 1000 Full | |
| Energy Efficient Ethernet | ○ Enabled ○ Disabled | |
| Energy Efficient Ethernet LLDP | ○ Enabled ○ Disabled | |
| Short Reach Energy Saving | ○ Enabled ○ Disabled | |
| Back Pressure | ○ Enabled ○ Disabled | |
| Flow Control | ○ Enabled ○ Disabled | |
| MDI/MDIX | ○ Auto ○ XXX | |

(bracket: 1014)

Step 3a of 4

[ Back ] [ Next ] [ Apply ] [ Cancel ]

FIG. 10

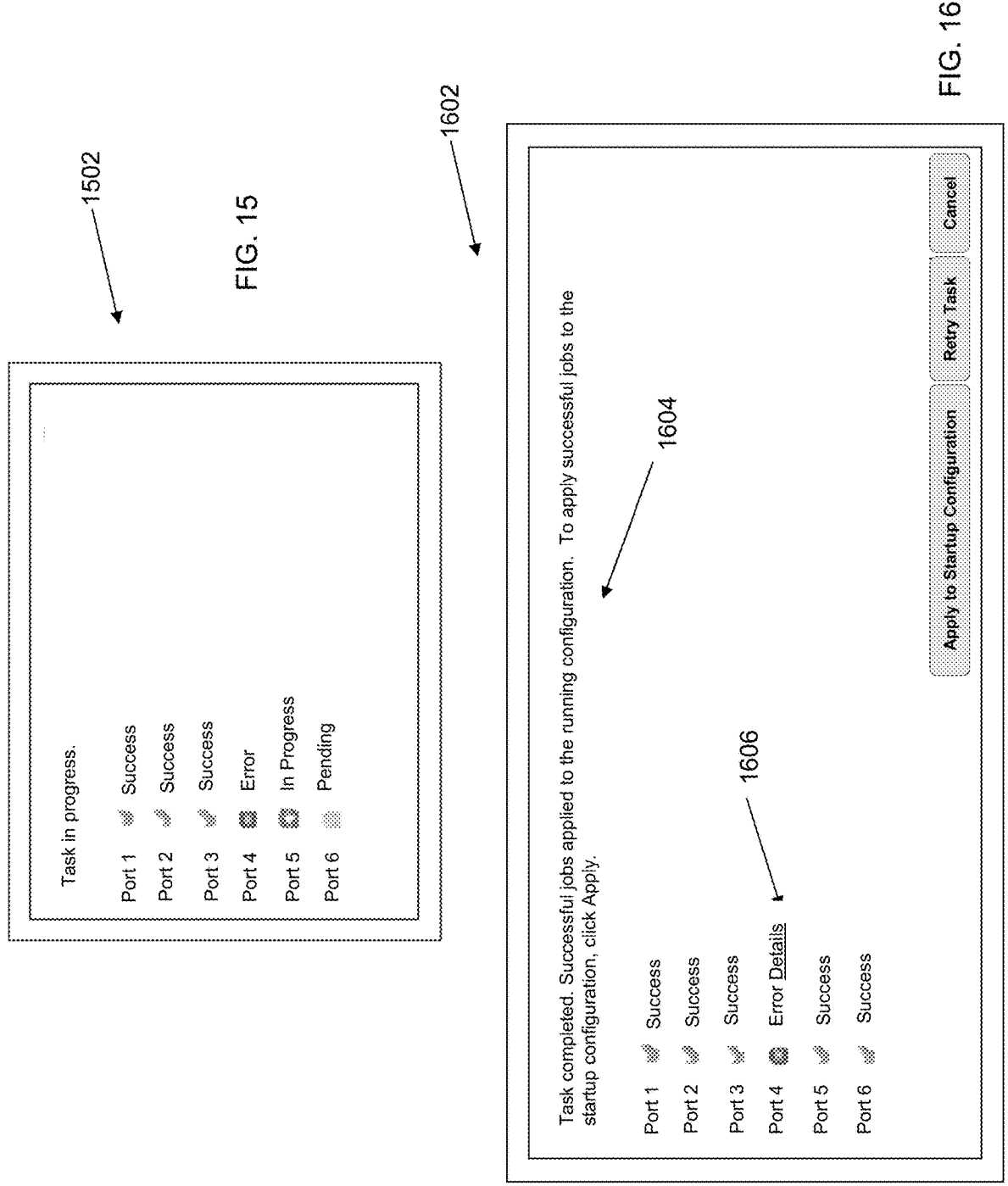

MULTI-PORT SELECTION AND CONFIGURATION

BACKGROUND

The present disclosure relates generally to information handling systems, and more particularly to a multi-port configuration system for configuring ports on an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHSs) such as, for example, network IHSs, include the ability to transmit and receive Ethernet protocol communications via transceivers such as Small Form-factor Pluggable (SFP) transceivers, enhanced Small Form-factor Pluggable (SFP+) transceivers, 10 Gigabit Small Form-factor Pluggable (XFP) transceivers, Quad(4-channel) Small Form-factor Pluggable (QSFP or QSFP+) transceivers, and/or a variety of other transceivers known in the art. Depending on the type of transceiver used, a port on a network IHS may also include the ability to transmit data according to several variable transmission parameters including transmission speed, duplex mode, flow control, and/or a variety of other transmission parameters known in the art. Currently, regardless of whether a command-line interface (CLI) or graphical user interface (GUI) is used, network IHS port configuration requires a user to configure one IHS port at a time. Such IHS port configuration is tedious, time-consuming, and error-prone, particularly when groups of IHS ports share similar profiles. For example, a group of IHS ports may be assigned to the same virtual local area network (VLAN), local area group (LAG), or spanning tree, among others, and individual IHS port configuration in such cases can be especially susceptible to mistakes.

Accordingly, it would be desirable to provide an improved system for configuring ports on an IHS.

SUMMARY

According to one embodiment, a multi-port configuration system includes a network switch including a plurality of ports and a user device that is configured to couple to the network switch. Each of the plurality of ports is configured to operate in at least one of a plurality of modes. A congruent graphical representation of the network switch is displayed on the user device (e.g., by a wizard executing on the user device), and a selection of a group of ports of the plurality of ports is received by the user device. The user device may determine a port type for each port of the plurality of ports. Alternatively, the user device may determine a port type for each port of the selected group of ports. Based on the received selection of the group of ports, and the determined port types, available configuration settings for the group of ports are displayed on the user device. A configuration settings selection, selected from the available configuration settings for configuring the group of ports is received. The configuration settings selection is provided to the network switch to configure the group of ports.

BRIEF DESCRIPTION OF THE DRAWINGS

FIGS. 4-18 show illustrations of a multi-port configuration workflow, in accordance with the method of FIG. 3, for configuring ports on a network switch.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
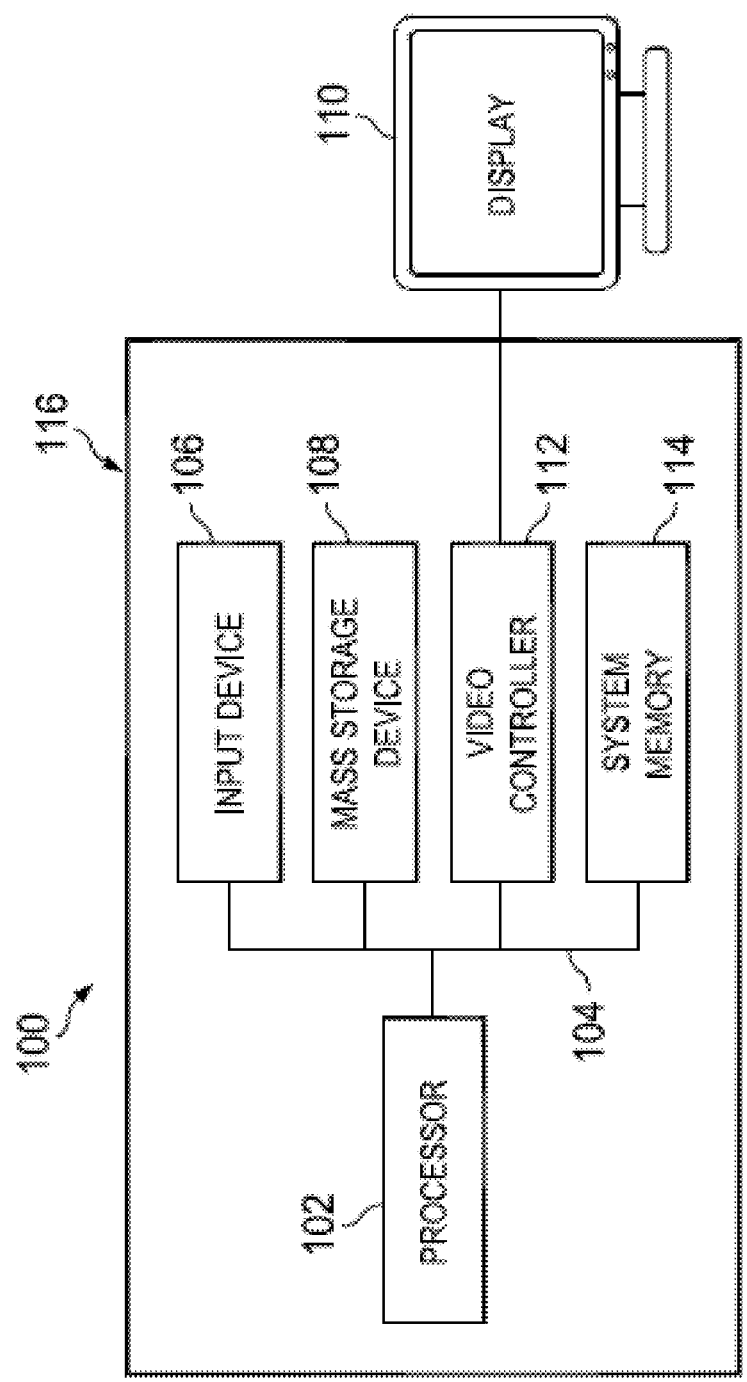
FIG. 1 is a schematic view illustrating an embodiment of an information handling system (IHS)

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
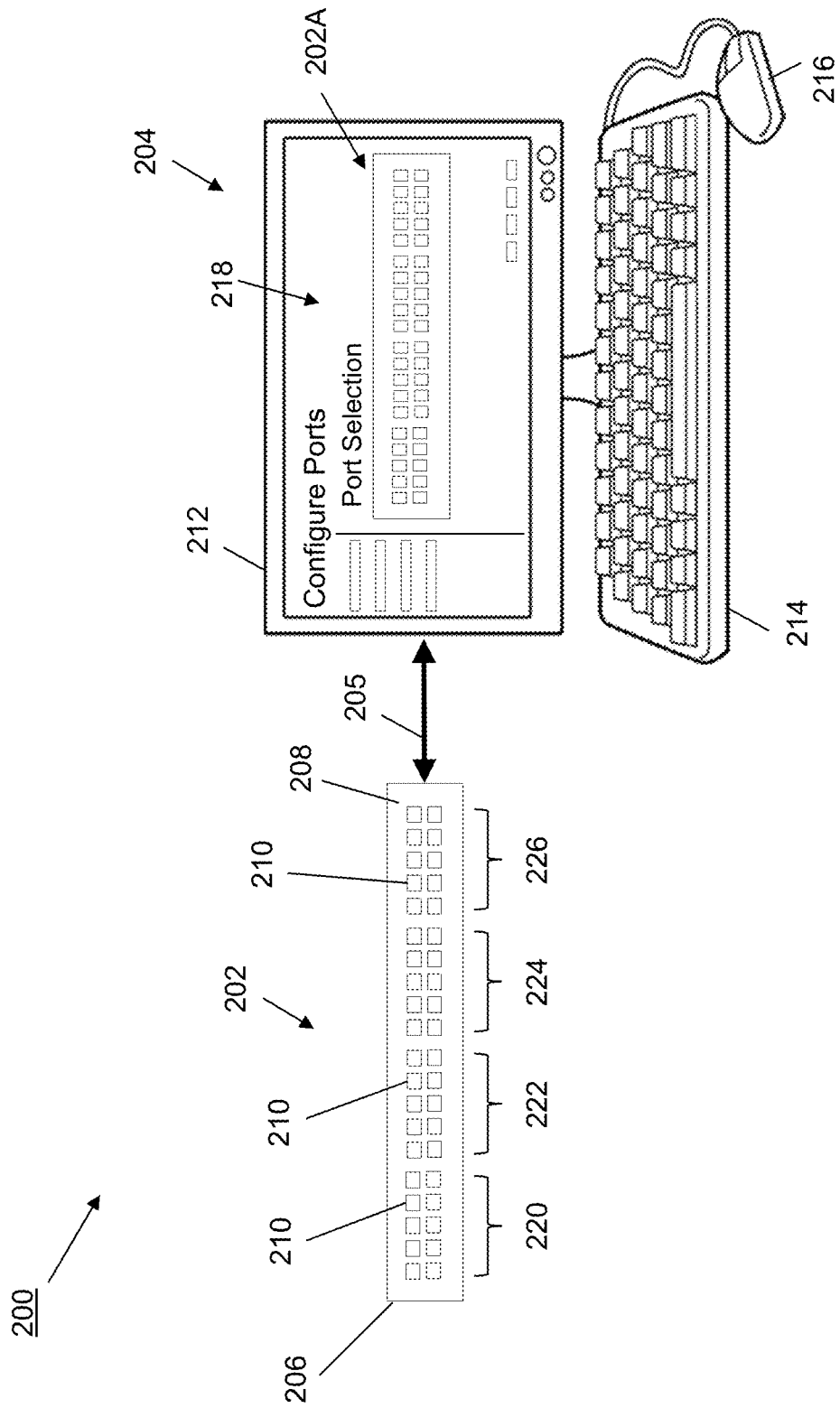
FIG. 2 is a schematic view illustrating a network switch and a user device, in accordance with some embodiments.

Referring now to FIG. 2, an embodiment of a multi-port configuration system 200, including a switch 202 and a user device 204, is illustrated. In some embodiments, the switch 202 includes an Ethernet switch IHS, but other Ethernet devices and IHSs (e.g., server IHSs, storage IHSs, desktop IHSs, portable IHSs, and/or a variety of other IHSs and devices) are envisioned as falling within the scope of the present disclosure. Alternatively, in some embodiments, the switch 202 includes a Fibre Channel switch IHS, but other Fibre Channel devices and IHSs (e.g., server IHS's, storage IHS's, desktop IHS's, portable IHS's, and/or a variety of other IHSs and devices) are envisioned as falling within the scope of the present disclosure. The switch 202 may be the IHS 100, discussed above with reference to FIG. 1, and/or may include some or all of the components of the IHS 100. The switch 202 includes a chassis 206 that houses a plurality of Ethernet switch IHS or Fibre Channel switch IHS components (e.g., the processor 102, storage device 108, system memory 114, and/or other IHS components discussed above with reference to FIG. 1, switching IHS components know in the art, and/or a variety of other IHS components known in the art). The switch 202 also includes an outer surface 208, and a plurality of ports 210 (e.g., Ethernet or Fibre Channel ports) are located on the chassis 206 and accessible on the outer surface 208. In an embodiment, the plurality of ports 210 are female ports (e.g., female Ethernet or Fibre Channel ports). For example, in some embodiments, the plurality of ports 210 includes a plurality of Ethernet ports including female SFP or SFP+ ports, female RJ45 ports, and/or a variety of other female Ethernet ports known in the art. In another example, the plurality of ports 210 includes a plurality of Fibre Channel ports including bidirectional (BiDi) optical ports, Lucent/Little/Local Connector (LC) optical ports, duplex LC optical ports, Subscriber/Square/Standard Connector (SC) optical ports, Multiple Fiber Push-On/Pull-Off (MTP/MPO) optical ports, and/or a variety of other optical ports known in the art. Thus, in some embodiments, the switch 202 is configured to communicate through the plurality of ports 210 using Ethernet protocol signals. Alternatively, in some embodiments, the switch 202 is configured to communicate through the plurality of ports 210 using Fibre Channel protocol signals (e.g., FCoE signals). In some embodiments, any of the plurality of ports 210 may be configured to transmit power using PoE methods known in the art.

In some embodiments, the user device 204 includes a computer system having a monitor 212, a keyboard 214, and a mouse 216. In some embodiments, the user device 204 is the IHS 100, discussed above with reference to FIG. 1, and/or may include some or all of the components of the IHS 100. The user device 204 is configured to communicate with the switch 202 wirelessly or through a cabled connection, as indicated by arrow 205, for example to configure one or more of the plurality of ports 210. While the user device 204 is illustrated as a desktop computer, it will be understood that the user device 204 may equally include a laptop computer, a tablet, or other computing device as known in the art while remaining within the scope of the present disclosure. As shown, the monitor 212 includes a display 218 which in the example of FIG. 2 displays a user interface (UI) which may be part of a directed workflow used for multi-port configuration, as described in more detail below with reference to FIGS. 3-18. In the embodiments described herein, a graphical representation 202A of the switch 202 can be provided on the display 218. In particular, the graphical representation 202A provides a congruent (i.e., accurate) physical representation of the switch 202. Thus, the layout of the plurality of ports 210, as shown in the display 218, is congruent with the actual layout of the plurality of ports 210 of the physical switch 202. In conventional systems, the port layout, as shown in displays (e.g., the display 218) of conventional UIs, may not be congruent with a physical switch (e.g., the switch 202). For example, conventional UIs may present ports as being vertically distributed when they are actually distributed horizontally. By providing UIs which accurately represent the physical port layout of a switch, embodiments of the present disclosure help to reduce user errors (e.g., when configuring ports) and increase user efficiency (e.g., by reducing an amount of time a user spends trying to find a port on the UI which corresponds to a particular physical port).

Consider now, for purposes of illustration, a situation where the plurality of ports 210 are divided into groups 220, 222, 224, and 226. Further, consider that the switch 202 is to be configured such that groups 220, 222, 224, 226 each correspond to a different port configuration (e.g., VLAN assignment, LAG assignment, or spanning tree assignment, etc.). It is noted that the port groupings 220, 222, 224, 226 are merely for purposes of illustration and other groupings may be equally employed without departing from the scope of the present disclosure. For example, in some embodiments, a group of ports of the plurality of ports 210 may include a single port. In another example, a group of ports of the plurality of ports 210 may include all the ports of the plurality of ports 210. Continuing with the present illustration, consider that the plurality of ports 210 of group 220 are to be assigned to a first VLAN, the plurality of ports 210 of group 222 are to be assigned to a second VLAN, the plurality of ports 210 of group 224 are to be assigned to a third VLAN, and the plurality of ports 210 of group 226 are to be used by PoE devices. In order for a user to configure each of the plurality of ports 210 for all port groups 220, 222, 224, 226, in accordance with the exemplary assignments given above and utilizing existing conventional practices, the user would generally (1) select an individual port of the plurality of ports 210 for configuration, (2) configure port parameters (e.g., VLAN mode and tagging membership), and (3) apply changes to the selected individual port. If the user wants to configure additional ports of the plurality of ports 210, for example using the same configuration as that of the previously configured port, the user would have to repeat steps (1), (2), and (3) for each port sharing the same VLAN configuration. Thus in general, for existing solutions, a user would have to perform such repeated steps for each port of the plurality of ports 210 for all port groups 220, 222, 224, 226, whether assigning ports to a particular VLAN, LAG, spanning tree, or PoE, etc. In the case of a 48-port switch, therefore, a user would have to perform the above steps 48 times each, greatly increasing the time required for port configuration and increasing the possibility of user error.

The embodiments of the present disclosure provide a streamlined and efficient method for IHS port configuration. As described in more detail below, embodiments disclosed herein provide for the selection and configuration of multiple ports simultaneously, avoiding costly time loss and potential user errors. Additionally, as discussed below with reference to FIGS. 3-18, directed workflows, for example implemented in the form of a software wizard, guide a user through the steps necessary to configure IHS ports. The use of such a wizard helps to break up complex tasks into smaller tasks, while accurately accounting for port dependencies. For example, depending on a port type (e.g., copper, SFP, or SFP+), certain workflows may be shown/hidden by the wizard in accordance with the port type(s) being configured. In various embodiments, the wizard can also display configuration summaries (e.g., via the display 218) prior to committing to and applying the configuration. As described above, embodiments of the present disclosure also provide a UI which corresponds to a physical switch/port layout. Thus, the present embodiments provide users, even users with limited IT skills, to efficiently perform IHS port configurations, thereby saving time and resources.

Figure 3:
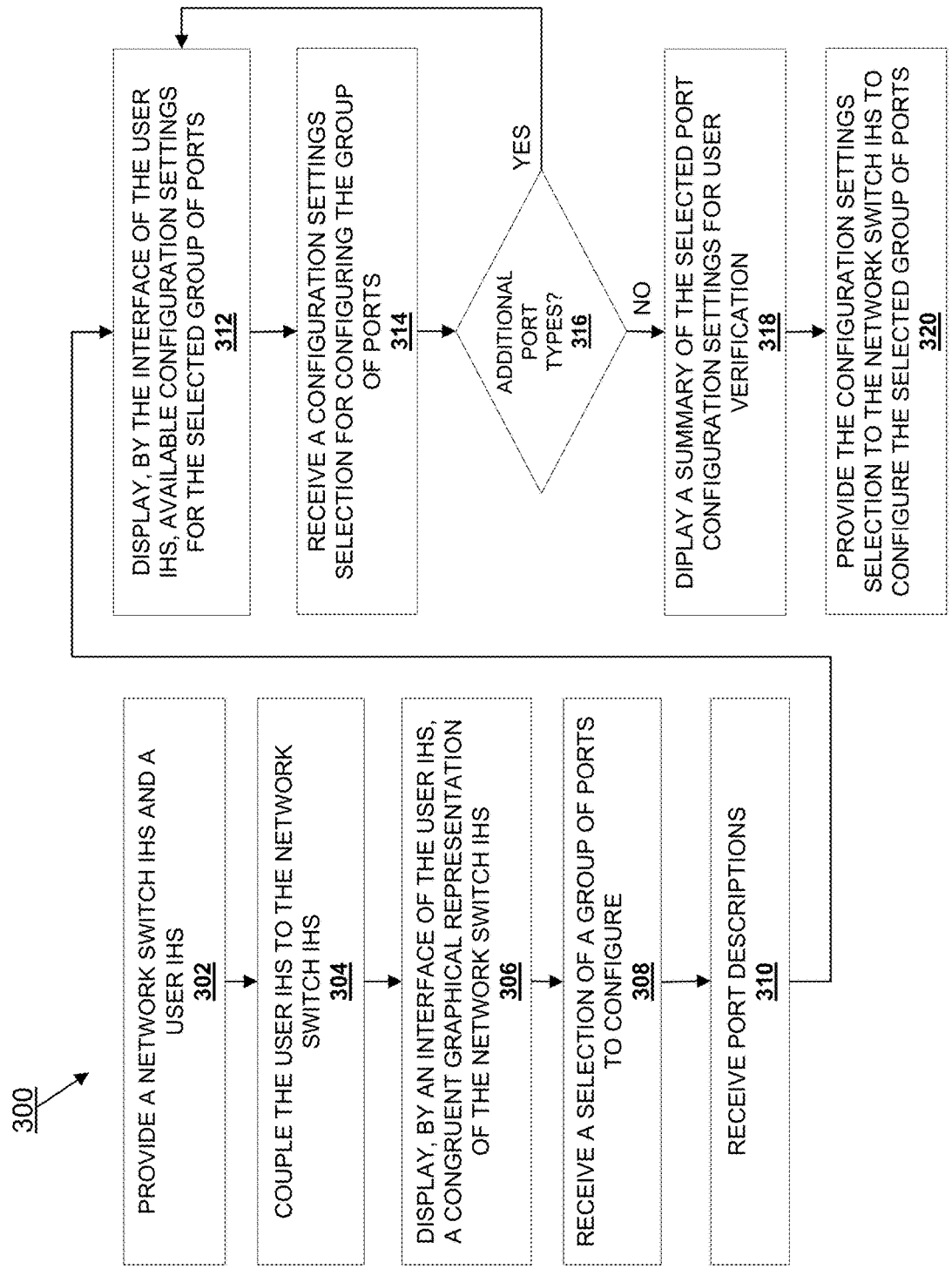
FIG. 3 is a flow chart illustrating an embodiment of a method for configuring ports on a network switch.

Referring now to FIG. 3, an embodiment of a method 300 for configuring ports on a network switch is illustrated. The method 300 begins at block 302 where a network switch IHS and a user IHS may each be separately provided. In an embodiment, the multi-port configuration system 200 discussed above with reference to FIG. 2, including the switch 202 configured to communicate with the user device 204, is provided. In some embodiments, each port of the plurality of ports 210 may include one of a variety of Ethernet port types or optical port types, as discussed above. Also, in various embodiments, each port of the plurality of ports 210 can be assigned to a particular virtual local area network (VLAN), local area group (LAG), spanning tree, or may be configured to transmit power using PoE, among other configurations as known in the art. In addition, each port of the plurality of ports 210 of the switch 202 is configured to operate in a plurality of different modes. For example, the plurality of different modes may include parameters such as transmission speed, duplex mode, flow control, auto-negotiation mode, and/or a variety of other configuration parameters known in the art.

The method 300 then proceeds to block 304 where the user IHS is coupled to the network switch IHS. Referring to FIG. 2, in an embodiment of block 304, the user device 204 is coupled to the switch 202. In one example, the user device 204 couples to the switch 202 by way of an Ethernet port connection. In some embodiments, upon coupling the user device 204 to the switch 202, the user device 204 may communicate with the switch 202 to determine a port type for each port of the plurality of ports 210 of the switch 202. The method 300 then proceeds to block 306 where a user interface including a congruent graphical representation of the switch 202 is displayed. As discussed above, in an embodiment of block 306, the user device 204 may display the graphical representation 202A of the switch 202. More particularly, in the embodiments discussed herein, the user device 204, which includes a plurality of IHS components (e.g., the processor 102, storage device 108, system memory 114, etc.), also includes program code that when executed by the processor cause the user device 204 to perform one or more steps associated with the methods described herein. For example, as described in more detail below with reference to FIGS. 4-18, the program code executed by the processor may cause the user device 204 to execute a directed workflow (e.g., implemented in the form of a software wizard) to guide a user through the steps necessary to configure a plurality of ports, such as the ports 210 of the switch 202.

Figure 4:
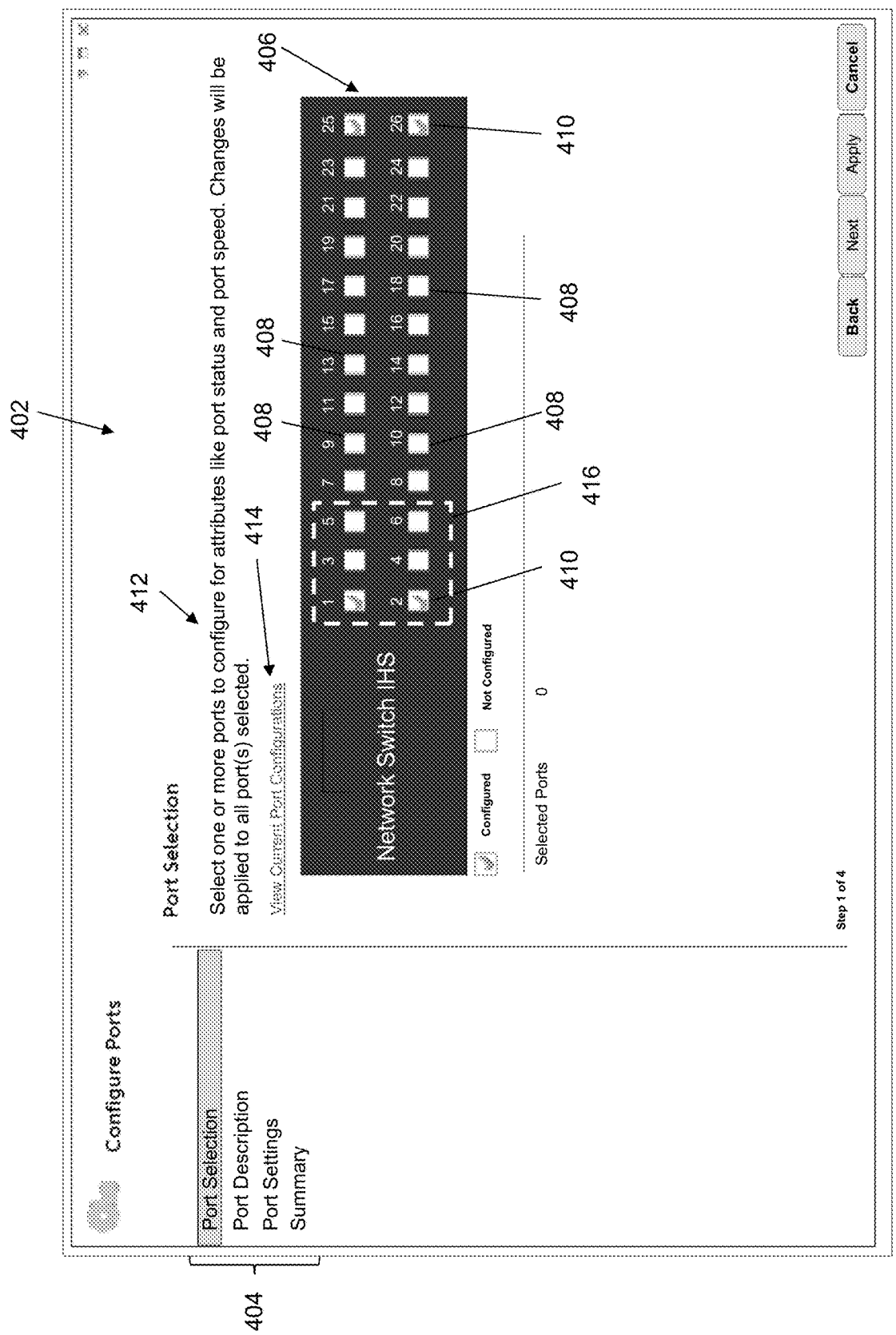

Referring to FIG. 4, an exemplary graphical user interface (GUI) display 402, which is part of a directed workflow (i.e., wizard) used for multi-port configuration, is illustrated. In some embodiments, the GUI display 402 may be displayed on a user IHS device, such as the user device 204, shown in FIG. 2. In some examples, the display 402 includes a menu 404 which may be used to indicate a current stage of a port configuration process. Such port configuration stages, as implemented by the illustrative wizard, may include a port selection stage, a port descriptions stage, a port settings stage, and a summary stage. In various embodiments, the software including the directed workflow (i.e., the wizard) may already be executing on a user device IHS (e.g., the user device 204). Alternatively, a user may initiate the multi-port configuration workflow wizard by actively initiating the software application, for example, by way of the user device IHS. In some examples, the multi-port configuration wizard may be implemented within a modal window, thus requiring user interaction with the directed workflow windows to complete one or more of the multi-port configuration processes, as described herein.

In some embodiments, the display 402 includes a display of a first step (e.g., of the port selection stage) of a multi-port configuration workflow. In particular, the display 402 includes a congruent graphical representation 406 of a network switch IHS (e.g., such as the switch 202). In various embodiments, the particular styling of the graphical representation 406 depends on the physical network switch represented by the graphical representation 406. In addition, the network switch illustrated by the congruent graphical representation 406 includes a plurality of ports 408, 410. In some examples, some ports may have been previously configured (e.g., ports 410), as indicated by a check mark inside a box corresponding to such ports. Other ports which have not yet been configured, such as ports 408, may be indicated by an empty box corresponding to such ports. Informational text 412, may be provided, for example to inform a user of an expected wizard input. In the present example, the informational text 412 informs a user to select one or more ports to configure for attributes like port status and port speed. Additionally, the informational text 412 of the current example informs the user that changes will be applied to all port(s) selected. As described in more detail below, the directed workflow may proceed along one of a plurality of differing paths, depending on a port type and whether or not a particular port has been previously configured, among others. In addition, a current configurations link 414 may be provided to allow a user to view current configurations for each of the plurality of ports 408, 410. By way of example, and with reference to FIGS. 4 and 5, if a user clicks the current configurations link 414, a current port configurations window 502 may be displayed (e.g., by the user device 204). In some embodiments, the current port configurations window 502 includes a read-only popup window. In various embodiments, the current port configurations window 502 displays any of a plurality of port configuration information such as port status, port type (e.g., Ethernet, optical, etc.), LAN assignment, LAG assignment, spanning tree assignment, PoE assignment, transmission speed, duplex mode, flow control, auto-negotiation mode, and/or a variety of other configuration information as known in the art.

Figures 5, 6:
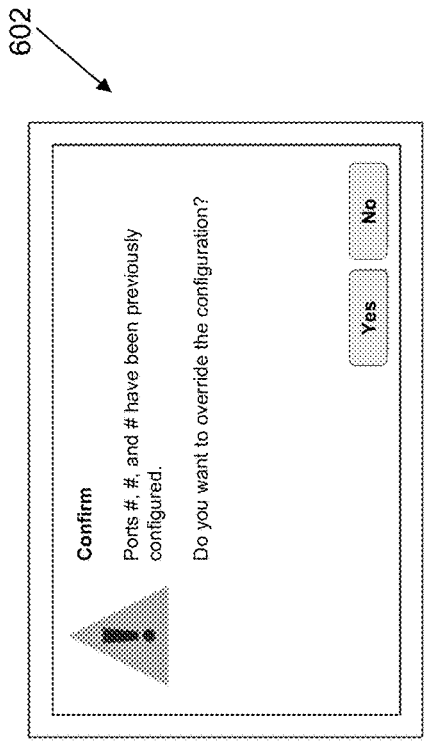

The method 300 then proceeds to block 308 where a selection of a group of ports to be configured is received. In an embodiment of block 308 and with reference to FIGS. 4 and 6, a group of ports 416 is selected (e.g., by a user) for configuration. It should be noted that while the exemplary selected group of ports 416 includes Ports 1-6, any alternative group of ports of the plurality of ports 408, 410 may alternatively be selected while remaining in the scope of the present disclosure. In some embodiments, upon selection of the group of ports 416, the user device 204 may communicate with the switch 202 to determine a port type for each port of the group of ports 416. In some embodiments, each port of the group of ports 416 may be selected by clicking (e.g., by a mouse) on one port at a time. In other embodiments, each port of the group of ports 416 may be selected by clicking (e.g., by a mouse) and dragging a selection box to encompass, and thereby select, all of the ports of the group of ports 416. In yet other embodiments, each port of the group of ports 416 may be selected by the use of context menus, by holding a keyboard 'Shift' key while clicking (e.g., to select a range of ports), by holding a keyboard 'Ctrl' key while clicking (e.g., to select any of a plurality of ports), or by other methods as known in the art. As discussed above, some ports may have been previously configured (e.g., ports 410), yet a user may include some previously configured ports in the selection of the group of ports 416. In some embodiments, if the multi-port configuration workflow wizard determines that previously configured ports are included in the selection of the group of ports 416, the wizard may display a user prompt 602. As shown in FIG. 6, the user prompt 602 displays information regarding which ports (e.g., of the group of ports 416) have previously been configured. In addition, the user prompt 602 confirms whether the user wants to override existing configurations of any previously configured ports of the group of ports 416. In some embodiments, with reference to the user prompt 602, if the user selects 'No', then the wizard may remove any previously configured ports from the selected group of ports 416. Alternatively, in some embodiments and with reference to the user prompt 602, if the user selects 'Yes', then the wizard may proceed with the configuration of all ports of the group of ports 416, as described below. In a further embodiment of block 308 and with reference to FIG. 7, and considering that the user has selected 'Yes' (at user prompt 602) to override any configuration of previously configured ports, selected ports of the group of ports 416 are indicated by a filled box 702, corresponding to such ports. In some embodiments, ports which have been previously configured (e.g., ports 410), and which are selected as part of the group of ports 416, may have any previously visible check mark masked by the filled box to indicate the port is currently selected to be configured. In various embodiments, upon completion of selection of a group of ports, such as the group of ports 416, a user may click a 'Next' button to proceed with port configuration, or a 'Back' button to go back and make a different selection of ports. Throughout the execution of the wizard, for example by the user device 204, the user may click a 'Cancel' button to abort the multi-port configuration wizard.

Figure 7:
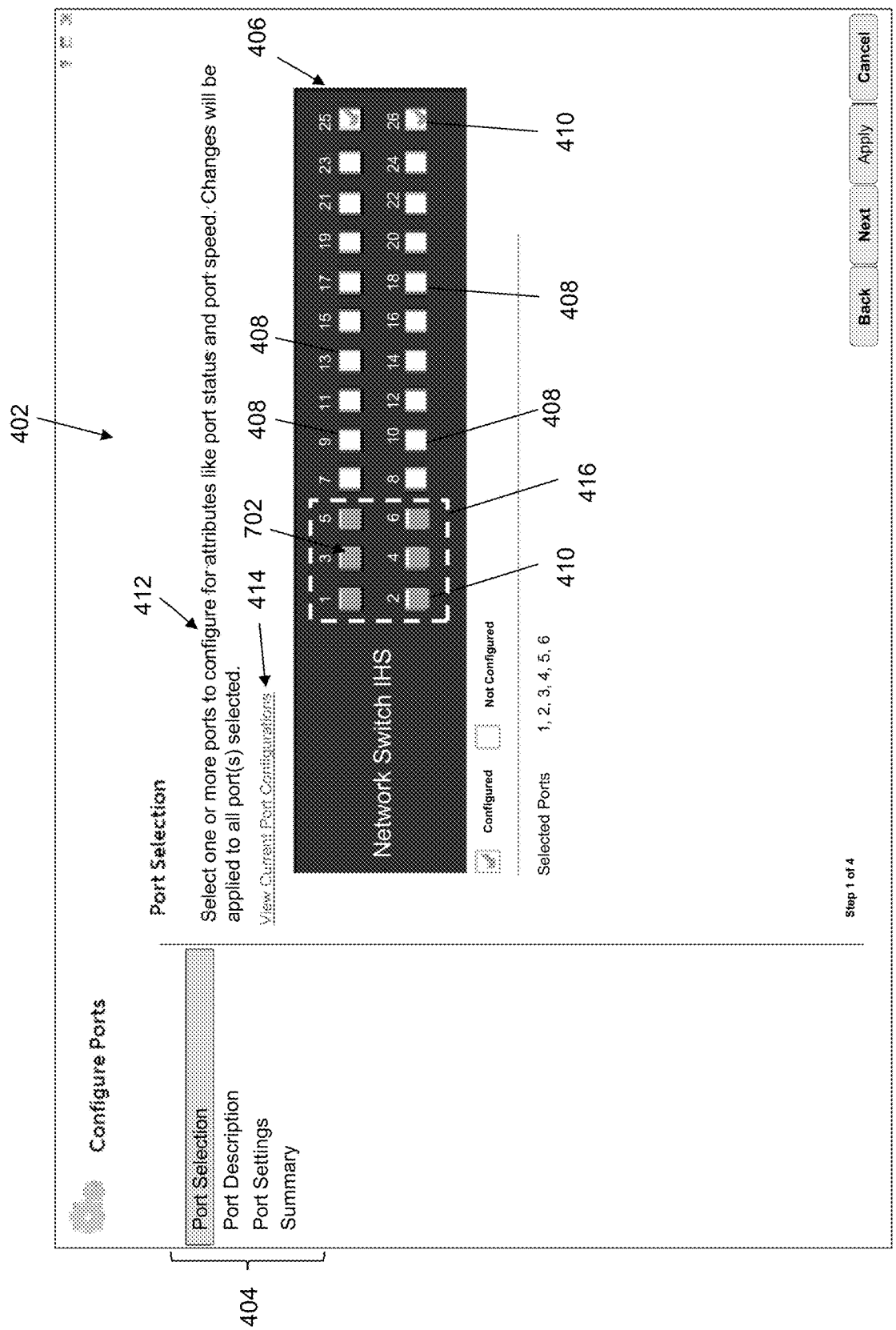
Figure 8:
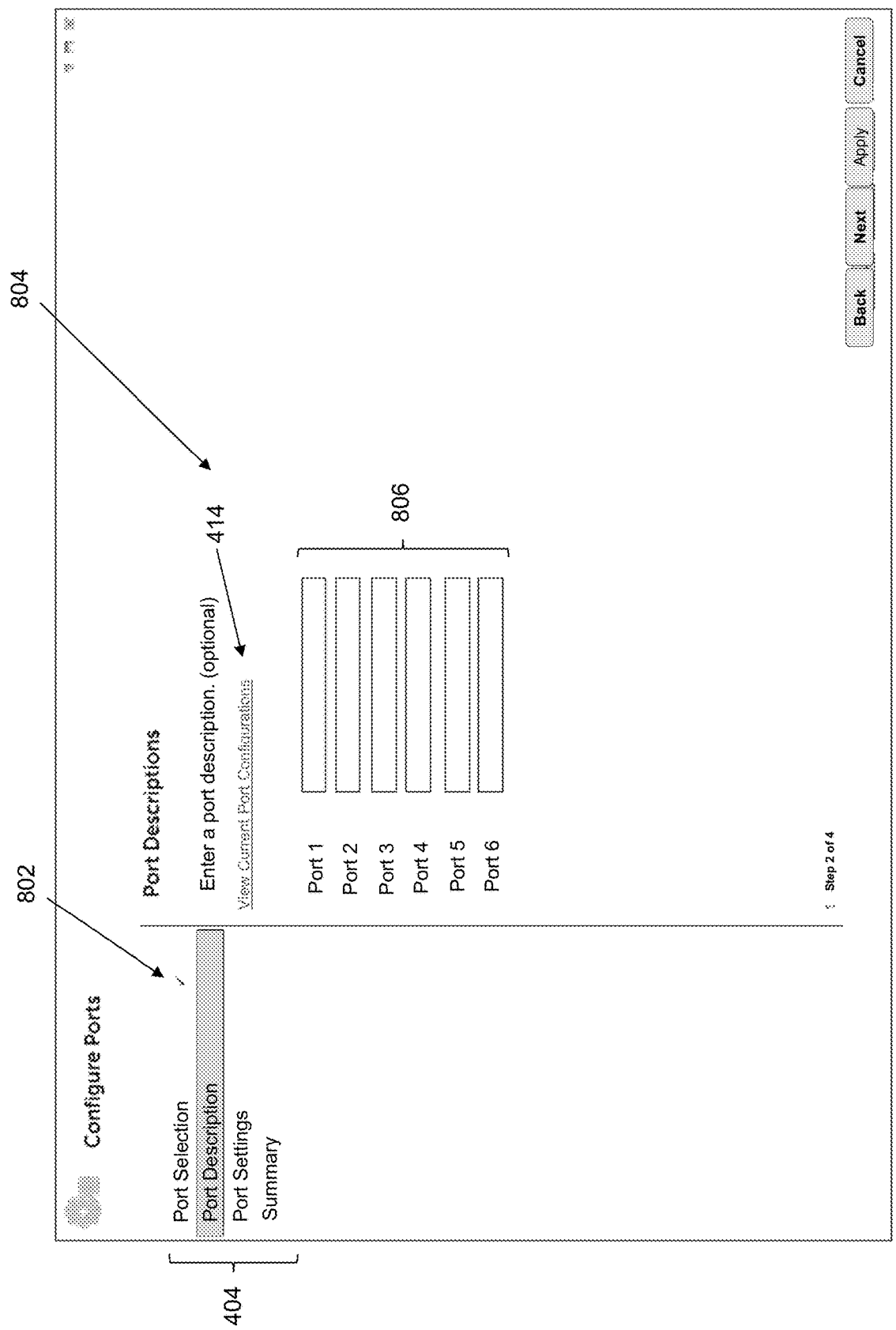

The method 300 then proceeds to block 310 where a description of the group of selected ports (e.g., ports 416) is received. With reference to FIG. 8, the multi-port configuration wizard proceeds to the port descriptions stage, as indicated by the menu 404. As shown in FIG. 8, the menu 404 also indicates successful completion of the port selection stage, as indicated by check mark 802. In an embodiment of block 310, FIG. 8 also illustrates a port description interface 804, where a user-defined description may be entered into text fields 806 which correspond to the selected group of ports 416 (FIG. 7). In this example, the selected group of ports 416 (FIG. 7) includes Port 1, Port 2, Port 3, Port 4, Port 5, and Port 6, as shown in FIG. 8. In some embodiments, the current configurations link 414 is again provided to allow a user to view current configurations for each of the plurality of ports 408, 410. In various embodiments, entering port descriptions is optional, and one or more of the text fields 806 may be left blank. Upon completion of entering of the port descriptions, or optionally skipping this step, a user may click a 'Next' button to proceed with the next stage of port configuration, a 'Back' button, or a 'Cancel' button.

Figure 9:
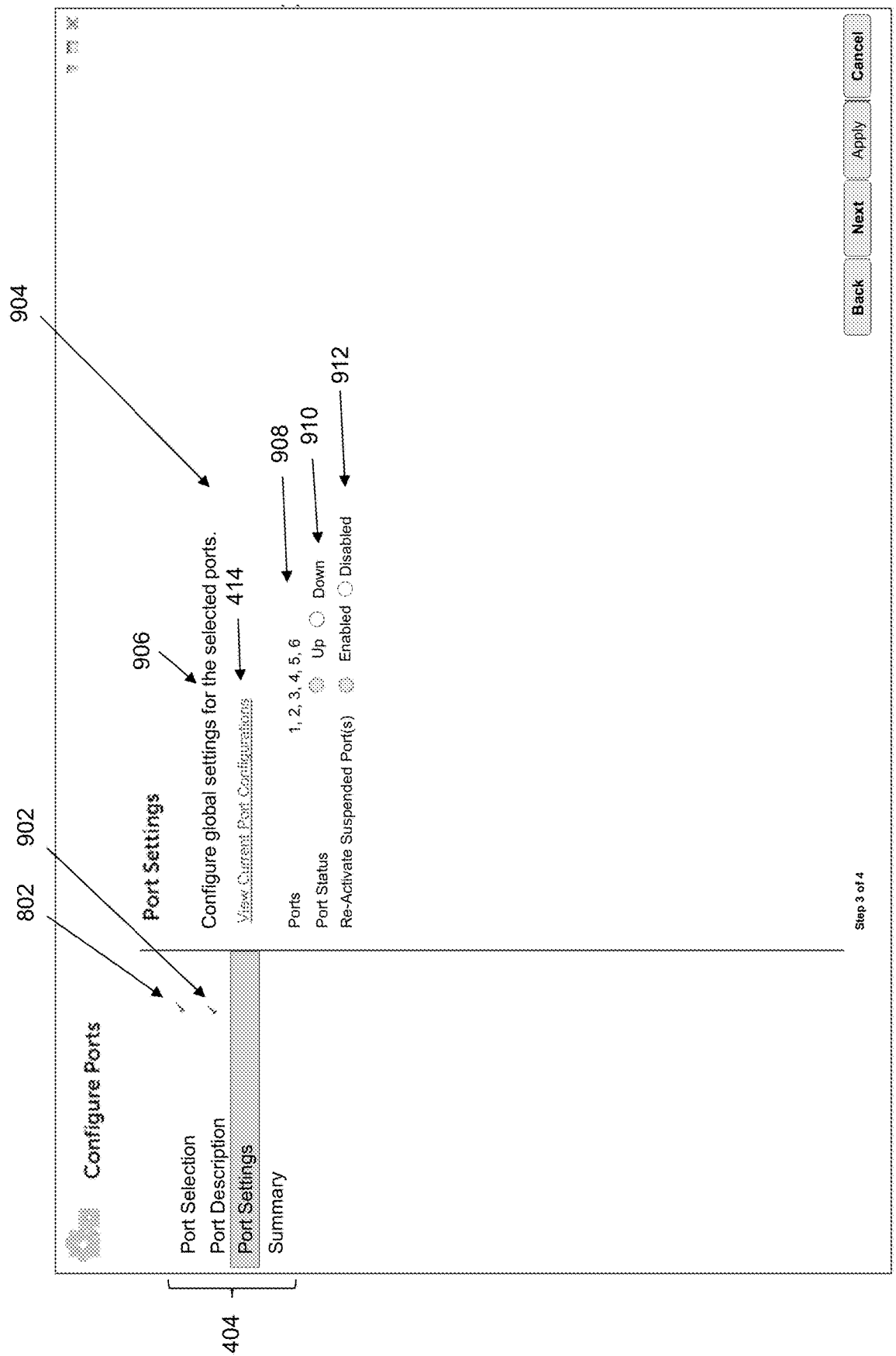

The method 300 then proceeds to block 312 where available configuration settings for the selected ports (e.g., ports 416) are displayed, for example, by the user device 204. In some embodiments, the available configuration settings displayed may be based on the port type determination, as discussed above. With reference to FIG. 9, the multi-port configuration wizard proceeds to the port settings stage, as indicated by the menu 404. As shown in FIG. 9, the menu 404 also indicates successful completion of the port selection stage and the port descriptions stage, as indicated by check marks 802 and 902. In some embodiments, the current configurations link 414 is again provided to allow a user to view current configurations for each of the plurality of ports 408, 410. In an embodiment of block 312, FIG. 9 also illustrates a global port settings interface 904, where global settings for the selected ports may be configured, as indicated by informational text 906. In the present example, the selected group of ports 416 (FIG. 7), which includes Ports 1-6, may be summarized at row 908. In various embodiments, a port status (e.g., 'Up' or 'Down') may be selected at row 910. In some embodiments, an option to re-activate suspended ports may be enabled/disabled at row 912. The method 300 then proceeds to block 314 where a configuration settings selection for the selected ports (e.g., ports 416) is received, for example by user selection (e.g., by clicking on desired configuration settings) via the user device 204, based on the displayed available configuration settings presented in the global port settings interface 904. In some examples, the global parameters 910, 912 for the selected ports (as shown at row 908) may be automatically preset to preconfigured 'default' settings. Upon selection of the global parameters 910, 912, a user may click a 'Next' button to proceed with the next stage of port configuration, a 'Back' button, or a 'Cancel' button. In some embodiments, if only global parameters are to be set, then the method 300 may determine at block 316 that there are no additional port types, and the method may proceed to block 318, where a summary of selected port configuration settings is displayed (e.g., by the user device 204) for user verification, as discussed below. However, in other embodiments, upon selection of the global parameters, as discussed with reference to FIG. 9 and in an embodiment of block 314, the method may proceed to configuration of individual ports of the selected group of ports 416. As discussed above, in some cases, the selected group of ports, such as the group of ports 416, may be divided into groups which may correspond to different port types (e.g., copper, SFP, or SFP+). Further, depending on a port type of a particular port or group of ports, certain workflows may be shown/hidden by the wizard in accordance with the port type(s) being configured. For purposes of illustration, consider that the selected group of ports 416 (FIG. 7), which includes Ports 1-6, is divided into three groups, where Ports 1 and 2 include copper ports, Ports 3 and 4 include SFP ports, and Ports 5 and 6 include SFP+ ports. Following this example, and in accordance with embodiments of the present disclosure, after a user clicks the 'Next' button (e.g., at FIG. 9) to proceed with the next step of port configuration, the method 300 determines that there are additional port types (at block 316) and the multi-port configuration wizard may proceed by presenting different workflows (FIGS. 10-12), corresponding to each of the three groups of ports (copper Ports 1, 2; SFP Ports 3, 4; and SFP+ Ports 5, 6).

In particular, upon determining that there are additional port types (at block 316), the method 300 may return to block 312 where available configuration settings for the copper Ports 1, 2 are displayed, for example, by the user device 204. In some embodiments, the available copper port configuration settings displayed may be based on the port type determination, as discussed above. In some embodiments, the multi-port configuration wizard presents a workflow corresponding to copper Ports 1, 2, as shown in FIG. 10. In a further embodiment of block 312 of the method 300, FIG. 10 illustrates a copper port settings interface 1004, where settings for the detected copper Ports 1 and 2 may be configured, as indicated by informational text 1006. The current configurations link 414 may be again provided to allow a user to view current configurations for each of the plurality of ports 408, 410. In various embodiments, the available configuration settings for the detected copper ports (e.g., Ports 1 and 2) may be displayed, for example, by the user device 204. In the presently illustrated copper port settings interface 1004, identification of the copper ports (i.e., Ports 1 and 2) may be summarized at line 1008. In some embodiments, the specific port type (e.g., 100M-copper) may be shown at line 1010. A port operational status (e.g., 'Active', 'Inactive') may be shown at line 1012. Additionally, in various embodiments, the copper port settings interface 1004 provides for configuration of a plurality of copper port parameters 1014 such as port speed, duplex mode, auto negotiation mode, advertisement mode, energy efficient Ethernet mode, energy efficient Ethernet link layer discovery protocol (LLDP) mode, short reach energy saving mode, back pressure mode, flow control, and medium dependent interface (MDI)/medium dependent interface crossover (MDIX) mode, among others. It should be noted that some of the settings shown in the plurality of copper port parameters 1014 have been designated as 'XXX', where such a designation is simply used as a placeholder and may be replaced by any of a plurality of settings as known in the art. Moreover, while some examples of copper port configuration parameters have been given, other copper port configuration parameters as known in the art may be equally used without departing from the scope of the present disclosure. The method 300 then proceeds to block 314 where a configuration settings selection for the copper ports (e.g., Ports 1 and 2) is received, for example by user selection (e.g., by clicking on desired configuration settings) via the user device 204, based on the displayed available configuration settings presented in the copper port settings interface 1004. Upon selection of the plurality of copper port parameters 1014, after a user clicks the 'Next' button (e.g., at FIG. 10), the method 300 may determine that there are additional port types (at block 316), and the multi-port configuration wizard may proceed by presenting different workflows (FIGS. 11-12) corresponding to the next group of ports (e.g., SFP Ports 3, 4; or SFP+ Ports 5, 6).

Figure 11:
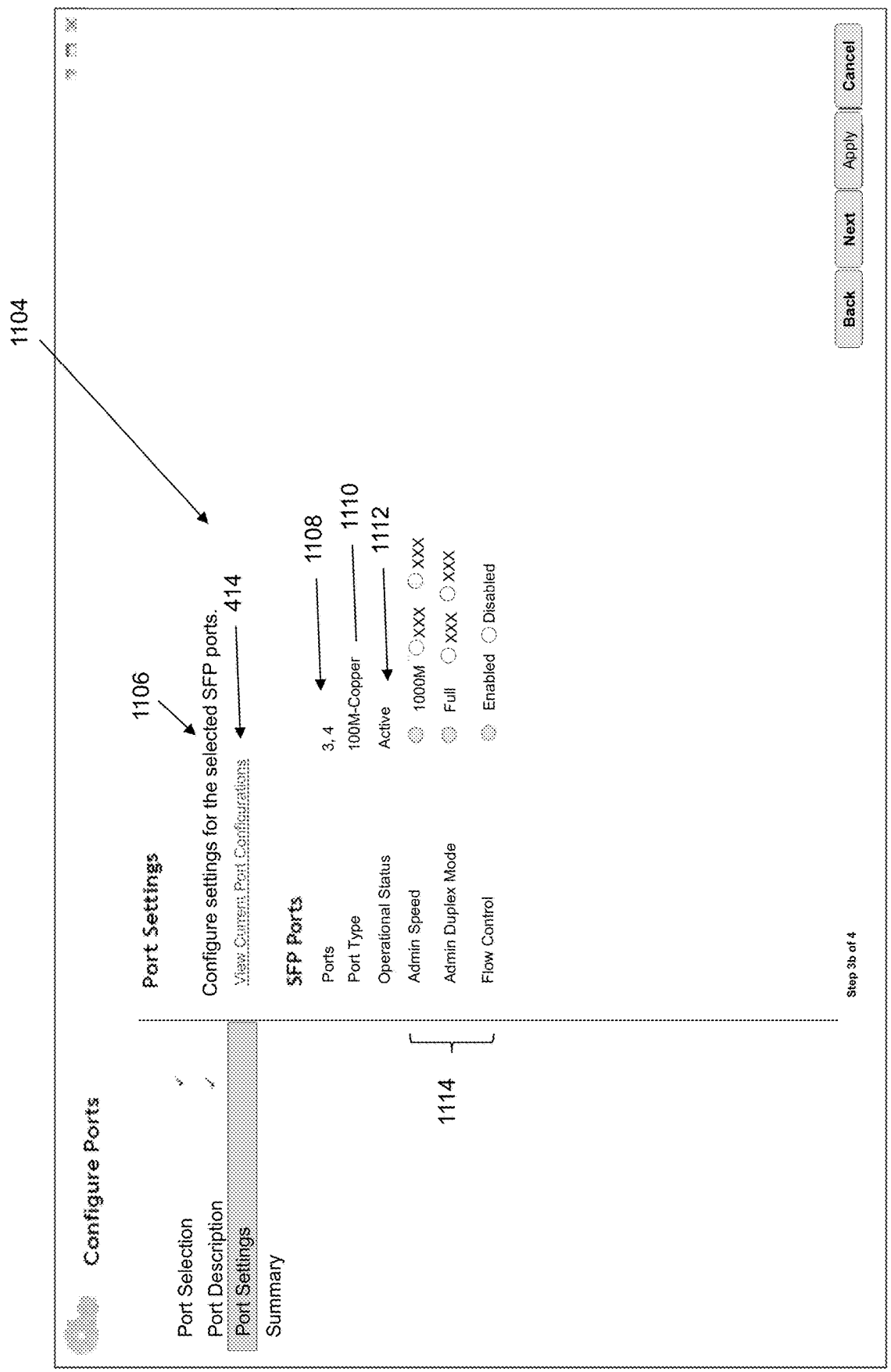

In particular, the method 300 may return to block 312 where available configuration settings for the SFP Ports 3, 4 are displayed, for example, by the user device 204. In some embodiments, the available SFP port configuration settings displayed may be based on the port type determination, as discussed above. In some embodiments, the multi-port configuration wizard presents a workflow corresponding to SFP Ports 3, 4, as shown in FIG. 11. In a further embodiment of block 312 of the method 300, FIG. 11 illustrates an SFP port settings interface 1104, where settings for the detected SFP Ports 3 and 4 may be configured, as indicated by informational text 1106. The current configurations link 414 may be again provided to allow a user to view current configurations for each of the plurality of ports 408, 410. In various embodiments, the available configuration settings for the detected SFP ports (e.g., Ports 3 and 4) may be displayed, for example, by the user device 204. In the presently illustrated SFP port settings interface 1104, identification of the SFP ports (i.e., Ports 3 and 4) may be summarized at line 1108. In some embodiments, the specific port type (e.g., 100M-copper) may be shown at line 1110. A port operational status (e.g., 'Active', 'Inactive') may be shown at line 1112. Additionally, in various embodiments, the SFP port settings interface 1104 provides for configuration of a plurality of SFP port parameters 1114 such as port speed, duplex mode, and flow control, among others. It should be noted that some of the settings shown in the plurality of SFP port parameters 1114 have been designated as 'XXX', where such a designation is simply used as a placeholder and may be replaced by any of a plurality of settings as known in the art. Moreover, while some examples of SFP port configuration parameters have been given, other SFP port configuration parameters as known in the art may be equally used without departing from the scope of the present disclosure. The method 300 then proceeds to block 314 where a configuration settings selection for the SFP ports (e.g., Ports 3 and 4) is received, for example by user selection (e.g., by clicking on desired configuration settings) via the user device 204, based on the displayed available configuration settings presented in the SFP port settings interface 1104. Upon selection of the plurality of SFP port parameters 1014, after a user clicks the 'Next' button (e.g., at FIG. 11), the method 300 may determine that there are additional port types (at block 316), and the multi-port configuration wizard may proceed by presenting the next workflow (FIG. 12) corresponding to the next group of ports (e.g., SFP+ Ports 5, 6).

Figure 12:
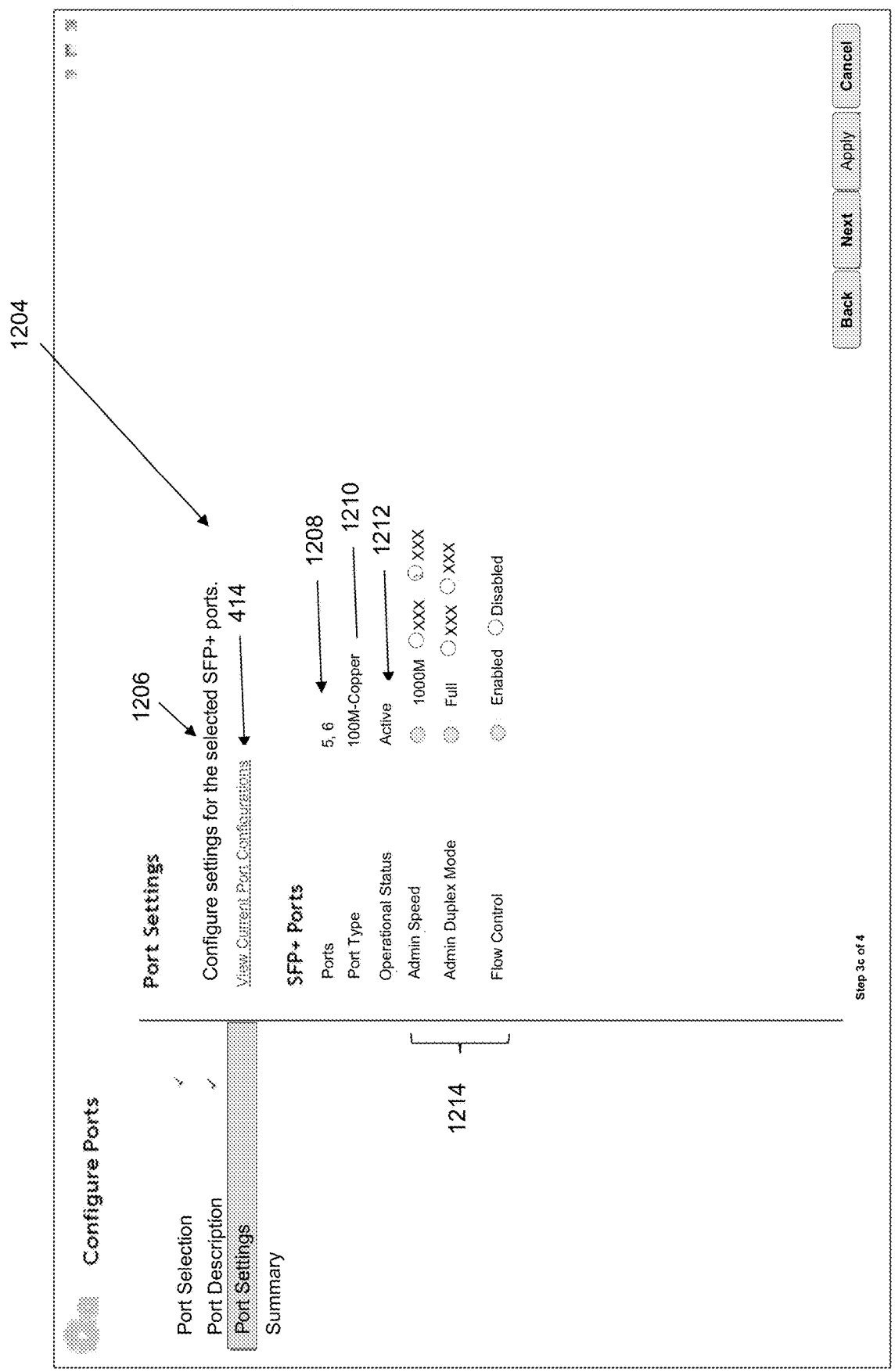

In particular, the method 300 may return to block 312 where available configuration settings for the SFP+ Ports 5, 6 are displayed, for example, by the user device 204. In some embodiments, the available SFP+ port configuration settings displayed may be based on the port type determination, as discussed above. In some embodiments, the multi-port configuration wizard may proceed by presenting a workflow corresponding to SFP+ Ports 5, 6, as shown in FIG. 12. In a further embodiment of block 312 of the method 300, FIG. 12 illustrates an SFP+ port settings interface 1204, where settings for the detected SFP+ Ports 5 and 6 may be configured, as indicated by informational text 1206. The current configurations link 414 may be again provided to allow a user to view current configurations for each of the plurality of ports 408, 410. In various embodiments, the available configuration settings for the detected SFP+ ports (e.g., Ports 5 and 6) may be displayed, for example, by the user device 204. In the presently illustrated SFP+ port settings interface 1204, identification of the SFP+ ports (i.e., Ports 5 and 6) may be summarized at line 1208. In some embodiments, the specific port type (e.g., 100M-copper)

may be shown at line 1210. A port operational status (e.g., 'Active', 'Inactive') may be shown at line 1212. Additionally, in various embodiments, the SFP+ port settings interface 1204 provides for configuration of a plurality of SFP+ port parameters 1214 such as port speed, duplex mode, and flow control, among others. It should be noted that some of the settings shown in the plurality of SFP+ port parameters 1214 have been designated as 'XXX', where such a designation is simply used as a placeholder and may be replaced by any of a plurality of settings as known in the art. Moreover, while some examples of SFP+ port configuration parameters have been given, other SFP+ port configuration parameters as known in the art may be equally used without departing from the scope of the present disclosure. The method 300 then proceeds to block 314 where a configuration settings selection for the SFP+ ports (e.g., Ports 5 and 6) is received, for example by user selection (e.g., by clicking on desired configuration settings) via the user device 204, based on the displayed available configuration settings presented in the SFP+ port settings interface 1204. Upon selection of the plurality of SFP+ port parameters 1214, after a user clicks the 'Next' button (e.g., at FIG. 12), the method 300 may determine that there are no more additional port types to configure (at block 316), and the multi-port configuration wizard may proceed with the next stage of port configuration.

Figure 13:
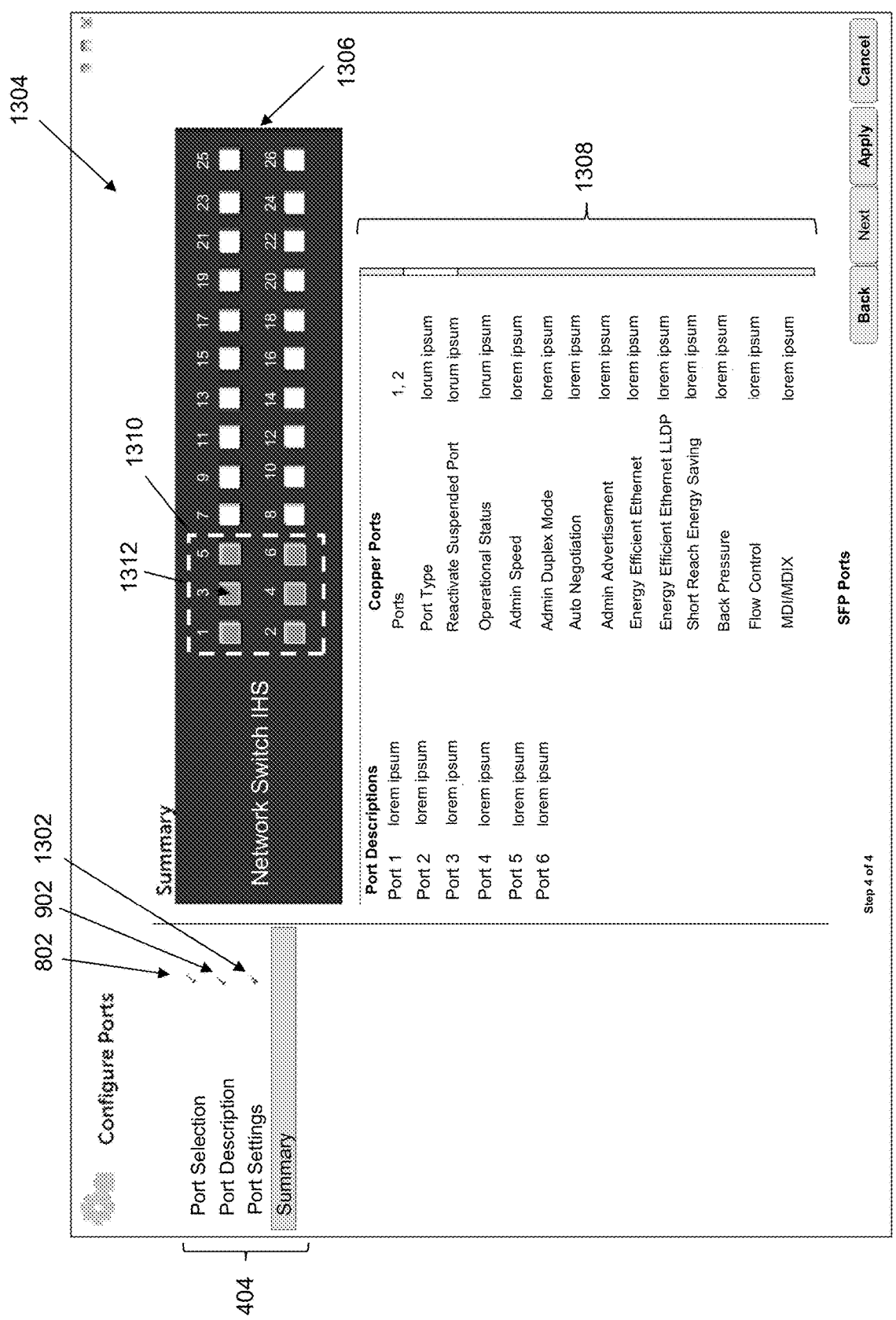
Figure 14:
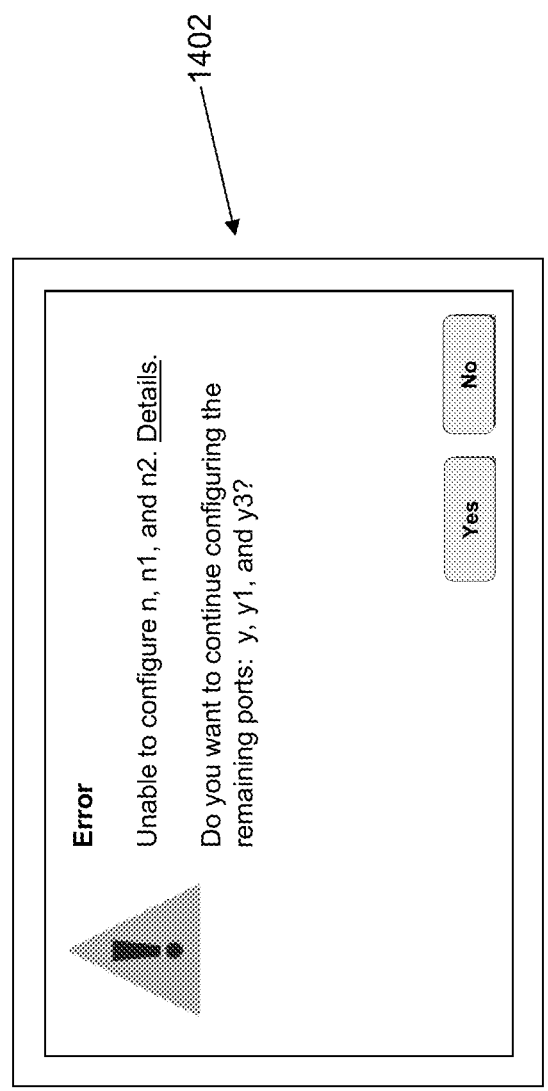

For example, the method 300 may then proceed to block 318 where a summary of selected port configurations (e.g., global settings, as well as settings for each port type) are displayed, for example, by the user device 204. With reference to FIG. 13, the multi-port configuration wizard proceeds to the summary stage, as indicated by the menu 404. As shown in FIG. 13, the menu 404 also indicates successful completion of the port selection stage, the port descriptions stage, and the port settings stage, as indicated by check marks 802, 902, and 1302, respectively. In an embodiment of block 318, FIG. 13 also illustrates a port settings summary interface 1304, which includes a congruent graphical representation 1306 of the network switch IHS (e.g., switch 202) that is being configured and a port settings detail section 1308. In the present example, a group of ports 1310, each indicated by a filled box 1312, provides a summary of ports (e.g., ports 1-6) which will have configuration settings applied (e.g., once a user clicks an 'Apply' button). In this example, the group of ports 1310 is the same as the group of ports 416 which were originally selected. However, in some cases, the group of ports 1310 to have settings applied may not be the same as an originally selected group of ports. In some embodiments, the port settings detail section 1308 includes a detailed view of each port to be configured, including port number, port type, and any one of the port configuration settings described above with reference to FIGS. 9-12. For purposes of illustration, with reference to the example described above, the port detail section 1308 may include global configuration parameters, copper port configuration parameters (e.g., for Ports 1 and 2), SFP port configuration parameters (e.g., for Ports 3 and 4), and SFP+ port configuration parameters (e.g., for Ports 5 and 6).

Once a user verifies the configuration settings to be applied (and to which ports) by way of the port settings summary interface 1304, the user may click an 'Apply' button (FIG. 13), and the method 300 then proceeds to block 320. At block 320, the configuration settings selections (e.g., global settings, as well as settings for each port type), as described above, are provided to the network switch IHS (e.g., switch 202) to configure the selected group of ports (e.g., ports 1310). Providing the configuration settings selections to the network switch IHS may include any of a variety of methods as known in the art. In some embodiments, a backend application, operating in conjunction with the frontend multi-port configuration wizard, may initiate commands to complete a desired output (i.e., providing configuration settings to the network switch IHS and configuring selected ports). By way of example, in some embodiments, the user device IHS (e.g., user device 204) may create a batch file which defines the configuration settings selections. In some examples, the batch file may be executed by one or more hardware processors of the user device IHS, which in turn communicates with the network switch IHS to configure the selected ports. In other examples, the batch file may be provided by the user device IHS to the network switch IHS, where it is executed by one or more hardware processors of the network switch IHS, which in turn configures the selected ports. While some examples of providing the configuration settings selections to the network switch have been described, other methods, as known in the art, of providing the configuration settings selections to the network switch for configuration of the selected ports may be used without departing from the scope of the present disclosure. As described in more detail below, when the user submits a port configuration job (e.g., by clicking the 'Apply' button as shown in FIG. 13), the backend application begins to apply the selected configuration settings to the selected ports. In some embodiments, configuration of the selected ports may be performed on one port at a time. In various embodiments, if the backend application encounters an error (or other issue) configuring a selected port, the backend application may flag the selected port and proceed to configuring a next port of the selected group of ports until the backend application has attempted to configure each port of the selected group of ports. In some embodiments, once the entire job (e.g., batch job) is complete, the user may be provided with a job output summary (e.g., by a user interface display of the user device 204).

Referring now to FIGS. 14-18, illustrated therein is a more detailed view of graphical UIs provided to a user during (and after) job execution (e.g., by the backend application discussed above). In some embodiments, upon user job submission and with reference to FIG. 14, the backend application may detect that one or more of the selected ports cannot be configured. In some examples, the one or more selected ports cannot be configured due to a hardware issue (e.g., the one or more selected ports are non-functional). In other cases, the desired port configuration may conflict with another configuration. For example, consider that a user configures ports first for a particular feature X, and then for a particular feature Y. In various embodiments, the multi-port configuration wizard software may check for dependencies between and/or among configured port features. Additionally, in some embodiments, the wizard may check for more global issues (e.g., some ports being configured for the feature Y may cause performance issues because of prior configuration of the feature X. In still other examples, the one or more selected ports may be part of a port channel, and a user may be attempting to apply configuration parameters which do not coincide to the port channel. In some cases, there may be a hardware configuration mismatch (e.g., configure a port for a VOIP phone and the port is actually connected to a camera, which would require different configuration parameters). The one or more selected ports may also be 'down' or disabled. While some examples of circumstances which could result in errors while attempting to configure the one or more selected ports have been given, other situations and/or circumstances as known in the art may also cause such errors, without departing from the scope of the present disclosure. In any event, if the backend application detects that one or more of the selected ports cannot be configured, the backend application may communicate with the wizard to display a user prompt 1402 (e.g., by a user interface display of the user device) that alerts a user as to which ports cannot be configured. In some embodiments, the user prompt 1402 may additionally request that the user to confirm whether or not to proceed with configuring any remaining ports which can be configured. In some embodiments, if the user selects 'No', then no ports may be configured and the method 300 may return to block 306. Alternatively, in some embodiments, if the user selects 'Yes', then the backend application may proceed to configure any ports (of the selected ports) which can be configured.

Referring now to FIGS. 15 and 16, illustrated therein is an embodiment of a job status graphical UI (FIG. 15) and job summary graphical UI (FIG. 16) which may be provided to a user during and after job execution, respectively. In some embodiments, upon user job submission and with reference to FIG. 15, a window 1502 (e.g., a modal popup window) may be provided (e.g., by a user interface of the user device 204) which provides a real-time status of progress of the submitted job. In the example illustrated in FIG. 15, a user may readily observe that configuration of Ports 1, 2, and 3 was successful, there was an error in the configuration of Port 4 (Port 4 was flagged and the process moved onto the next port, as discussed above), configuration of Port 5 is in progress, and configuration of Port 6 is pending. In various embodiments, because the task of configuring a plurality of ports may take a significant amount of time, and because the job may be asynchronous, the wizard submits the job to the backend (as discussed above) and periodically polls the backend application or the network switch IHS for a status of the job. Thus, in some embodiments, the term "real-time status" may refer to status updates which are provided at an interval substantially equal to the frequency of periodic polling. In some embodiments, if the user closes a window in which the wizard is executing (e.g., a web browser), the job can continue to execute, for example by way of the background application. In some embodiments, if the user logs out of the user device and logs back in (e.g., while the job is still running), the window 1502 may be provided (e.g., by a user interface of the user device 204), for example as a modal popup window, to display an updated real-time progress of the previously submitted job. Upon job completion, the job summary graphical UI (FIG. 16) including a window 1602 (e.g., a modal popup window) may be provided to the user (e.g., by a user interface of the user device 204). As shown in the summary UI of FIG. 16, informational text 1604 may notify a user that successful jobs (i.e., successful port configurations) have been applied to the running configuration, and if the user would like to apply the successful jobs to the startup configuration, the user should click the 'Apply to Startup Configuration' button. It should be noted that some switches (e.g., fibre switches) may not partition their configurations according to a startup configuration and a running configuration. Thus, in some cases, the 'Apply to Startup Configuration' button may be specific to switches that implement both startup and running configurations. In the present example, configuration of Ports 1, 2, 3, 5, and 6 was successful; however, there was an error in the configuration of Port. 4. In various embodiments, an error details link 1606 is provided to allow a user to view error details (e.g., a log file), and in some cases a recommended course of action to resolve the error, related to the configuration of the port which encountered the error (e.g., Port 4, in this example). In some examples, a recommended course of action to resolve the error may be included within the window 1602 (e.g., next to the Port 4 error status message). In some embodiments, if a user would like to retry the port configuration job, the user may click the 'Retry Task' button. In some embodiments, upon clicking the 'Retry Task' button, the wizard may return to the first step of the multi-port configuration workflow, as illustrated in FIG. 402.

Figure 17:
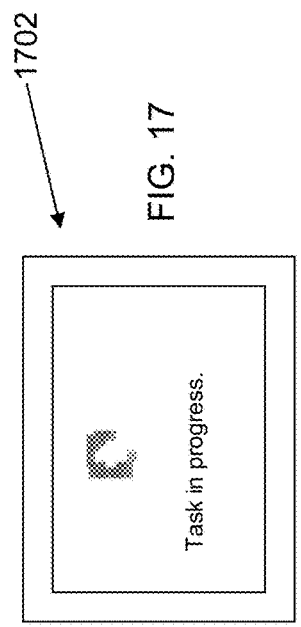
Figure 18:
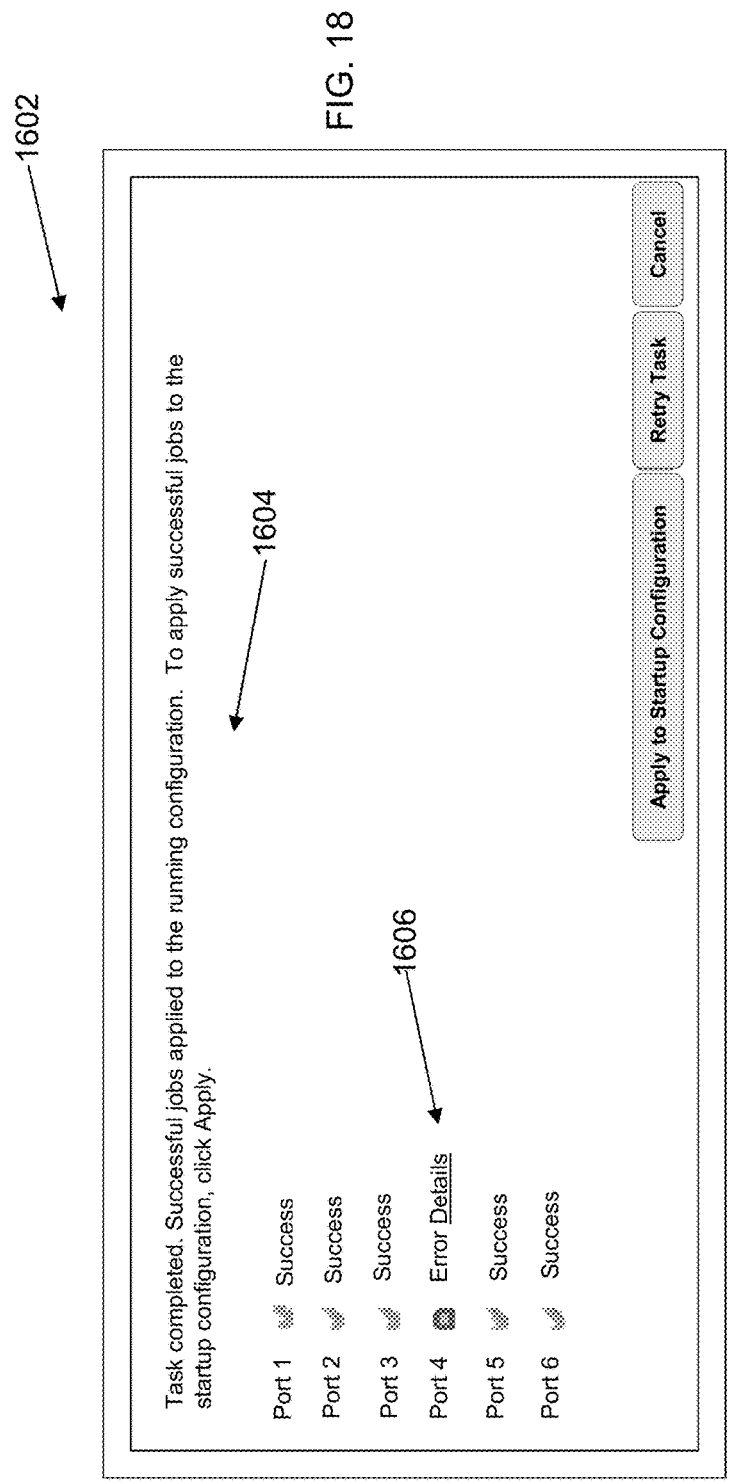

Referring now to FIGS. 17 and 18, illustrated therein is an alternative embodiment of a job status graphical UI (FIG. 17) and job summary graphical UI (FIG. 18) which may be provided to a user during and after job execution, respectively. In some embodiments, upon user job submission and with reference to FIG. 17, a window 1702 (e.g., a modal popup window) may be provided (e.g., by a user interface of the user device 204). In the example illustrated in FIG. 17, the window 1702 indicates that the task is in progress (i.e., port configuration of selected ports is in progress). In contrast to FIG. 15, the example of FIG. 17 may not provide detailed status updates for each port. Upon job completion, the job summary graphical UI (FIG. 18) including a window 1802 (e.g., a modal popup window) may be provided to the user (e.g., by a user interface of the user device 204). In some embodiments, the summary UI of FIG. 18 may be substantially the same as the summary UI of FIG. 16, described above.

Thus, systems and methods have been described which provide an improved system for configuring multiple ports of a network switch, avoiding costly time loss and potential user errors. By using directed workflows, for example implemented in the form of a software wizard, a user is guided through the steps necessary to configure IHS ports. Thus, complex tasks are broken up into smaller tasks, while accurately accounting for port dependencies. In particular, at least some embodiments of the present disclosure provide a perception to the user that they are applying one configuring to multiple ports, while in reality, the backend may be running a plurality of smaller tasks. In the present embodiments, the wizard may also display port configuration summaries prior to committing to and applying any selected port configurations. Additionally, embodiments of the present disclosure also provide a UI which corresponds to a physical switch/port layout. Thus, embodiments of the present disclosure provides for efficient performance of IHS port configurations, thereby saving time and resources.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-port configuration system, comprising:
a network switch including a plurality of ports, wherein each of the plurality of ports is configured to operate in at least one of a plurality of modes; and
a user device that is coupled to the network switch, wherein the user device is configured to:
display, via a user interface, a congruent graphical representation of the network switch including the plurality of ports, wherein the congruent graphical representation of the network switch displays an actual physical layout of the plurality of ports on the network switch;

receive, via the congruent graphical representation displayed by the user interface, a user input that provides a selection of a group of ports of the plurality of ports for configuration, wherein the group of ports includes a first subset of ports of a first port type and a second subset of ports of a second port type such that the group of ports includes more than one port;

display, via the user interface and in response to receiving the selection of the group of ports, available configuration settings that are each configured to cause the group of ports to transmit data according to one or more transmission parameters;

receive, via the user interface, a configuration settings selection for configuring the group of ports, wherein the configuration settings selection was selected from the available configuration settings; and provide the configuration settings selection to the network switch to configure each port in the group of ports to transmit data according to the one or more transmission parameters provided by the configuration setting selection.

2. The multi-port configuration system of claim 1, wherein the displaying the available configuration settings for the group of ports includes displaying, via the user interface, a first subset of the available configuration settings that are common to both the first port type and the second port type.

3. The multi-port configuration system of claim 2, wherein the displaying the available configuration settings for the group of ports includes displaying, via the user interface, a second subset of the available configuration settings for the first subset of ports of the first port type.

4. The multi-port configuration system of claim 3, wherein the displaying the available configuration settings for the group of ports includes displaying, via the user interface, a third subset of the available configuration settings for the second subset of ports of the second port type.

5. The multi-port configuration system of claim 1, wherein the user device is configured to:

determine that at least one port of the group of ports has been previously configured; and display, via the user interface and in response to determining that the at least one port has been previously configured, a user prompt that notifies a user that the at least one port has been previously configured, and requests confirmation to override the previous configuration of the at least one port.

6. The multi-port configuration system of claim 1, wherein the user device is configured to:

create a batch file that includes the configuration settings selection, wherein execution of the batch file causes the configuration of the group of ports.

7. The multi-port configuration system of claim 1, wherein the user device is configured to:

poll, during the configuration of the group of ports, the network switch to determine a status of the configuration of the group of ports; and display, via the user interface, the status of the configuration of the group of ports.

8. The multi-port configuration system of claim 1, wherein the user device is configured to:

detect, during the configuration of the group of ports, an error in the configuration of a particular port of the group of ports; and flag, in response to detecting the error, the particular port.

9. The multi-port configuration system of claim 1, wherein the first port type and the second port type each include one of: a copper port type, a small form-factor pluggable (SFP) port type, and an enhanced small form-factor pluggable (SFP+) port type.

10. The multi-port configuration system of claim 1, wherein the available configuration settings include one or more of a speed configuration setting, a duplex mode configuration setting, an auto-negotiation mode configuration setting, and a flow control configuration setting.

11. The multi-port configuration system of claim 1, wherein the user device is configured to:

display, via the user interface and prior to providing the configuration settings selection to the network switch, a summary of the configuration settings selection for user verification.

12. An information handling system (IHS), comprising:

a display device;

a user input device;

a processing system that is coupled to the display device and the user input device; and a memory system that is coupled to the processing system and that includes instructions that, when executed by the processing system, cause the processing system to:

display, on the display device, a user interface that includes a congruent graphical representation of a network switch including a plurality of ports, wherein the congruent graphical representation of the network switch displays an actual physical layout of the plurality of ports on the network switch;

receive, from the user input device and via the congruent graphical representation displayed by the user interface, a user input that provides a selection of a group of ports of the plurality of ports for configuration, wherein the group of ports includes a first subset of ports of a first port type and a second subset of ports of a second port type such that the group of ports includes more than one port;

display, on the display device and in response to the selection of the group of ports, the user interface including available configuration settings that are each configured to cause the group of ports to transmit data according to one or more transmission parameters;

receive, from the user input device and via the user interface, a configuration settings selection for configuring the group of ports, wherein the configuration setting selection was selected from the available configuration settings; and provide the configuration settings selection to the network switch to configure each port in the group of ports to transmit data according to one or more transmission parameters by the configuration setting selection.

13. The IHS of claim 12, wherein the displaying the user interface including the available configuration settings for the group of ports includes displaying, on the display device, the user interface including a first subset of the available configuration settings that are common to both the first port type and the second port type.

14. The IHS of claim 12, wherein the instructions, when executed by the processing system, cause the processing system to:

determine that at least one port of the group of ports has been previously configured and, in response, display, on the display device, the user interface including a user prompt that notifies a user that the at least one port has been previously configured, and requests confirmation to override the previous configuration of the at least one port.

15. The IHS of claim 12, wherein the instructions, when executed by the processing system, cause the processing system to:
create a batch file that includes the configuration settings selection, wherein execution of the batch file causes the configuration of the group of ports.

16. The IHS of claim 15, wherein the instructions, when executed by the processing system, cause the processing system to:
poll, during the configuration of the group of ports, the network switch to determine a status of the configuration of the group of ports.

17. A method for configuring multiple ports of a network switch, comprising:
displaying, by a user device via a user interface, a congruent graphical representation of a network switch that includes a plurality of ports, wherein the congruent graphical representation of the network switch displays an actual physical layout of the plurality of ports on the network switch;
receiving, by the user device via the congruent graphical representation displayed by the user interface, a user input that provides a selection of a group of ports of the plurality of ports for configuration, wherein the group of ports includes a first subset of ports of a first port type and a second subset of ports of a second port type such that the group of ports includes more than one port;
displaying, by the user device via the user interface and in response to receiving the selection of the group of ports, available configuration settings that are each configured to cause the group of port to transmit data according to one or more transmission parameters;
receiving, by the user device via the user interface, a configuration settings selection for configuring the group of ports, wherein the configuration settings selection was selected from the available configuration settings; and
providing, by the user device, the configuration settings selection to the network switch to configure each port in the group of ports to transmit data according to one or more transmission parameters provided by the configuration setting selection.

18. The method of claim 17, wherein the displaying the available configuration settings for the group of ports includes displaying, by the user device via the user interface, a first subset of the available configuration settings that are common to both the first port type and the second port type.

19. The method of claim 17, further comprising:
polling, by the user device during the configuration of the group of ports, the network switch to determine a status of the configuration of the group of ports; and
displaying, by the user device via the user interface, the status of the configuration of the group of ports.

20. The method of claim 17, further comprising:
detecting, by the user device during the configuration of the group of ports, an error in the configuration of a particular port of the group of ports; and
flagging, by the user device in response to detecting the error, the particular port.

* * * * *